US012629919B2

(12) United States Patent
Ogreten et al.

(10) Patent No.: US 12,629,919 B2
(45) Date of Patent: May 19, 2026

(54) FLEXIBLE MULTILAYER MATERIAL RESISTANT TO THE EXPLOSION OF AN ELECTRIC BATTERY

(71) Applicant: JEHIER, Chemillé-en-Anjou (FR)

(72) Inventors: Dogan Ogreten, Rochefort sur Loire (FR); Adrien Daude, Beaupréau en Mauges (FR); Cédric Huillet, Angers (FR); Paul Douaneau, Aubigné sur Layon (FR)

(73) Assignee: JEHIER, Chemillé-en-Anjou (FR)

( * ) Notice: Subject to any disclaimer, the term of this patent is extended or adjusted under 35 U.S.C. 154(b) by 198 days.

(21) Appl. No.: 18/485,551

(22) Filed: Oct. 12, 2023

(65) Prior Publication Data

US 2024/0123705 A1     Apr. 18, 2024

(30) Foreign Application Priority Data

Oct. 13, 2022     (FR) ...................................... 2210558

(51) Int. Cl.
B32B 5/26 (2006.01)
B32B 5/02 (2006.01)
(Continued)

(52) U.S. Cl.
CPC ............ B32B 5/2795 (2021.05); B32B 5/024 (2013.01); B32B 5/026 (2013.01); H01M 50/222 (2021.01);
(Continued)

(58) Field of Classification Search
CPC ....... B32B 5/2795; B32B 5/024; B32B 5/026; B32B 2264/303; B32B 2264/203;
(Continued)

(56) References Cited

U.S. PATENT DOCUMENTS 6,200,915 B1 * 3/2001 Adams ................... D06N 3/128
                                          428/36.1
2006/0115656 A1   6/2006 Martin
                    (Continued)

FOREIGN PATENT DOCUMENTS

EP            2322710 A1     5/2011
JP      2016198907 A   *  12/2016
WO      2019212549 A1    11/2019

OTHER PUBLICATIONS

English translation of JP2016-198907A from JPlatPat (Year: 2016).*

(Continued)

*Primary Examiner* — Alicia J Weydemeyer
*Assistant Examiner* — Laura B Figg
(74) *Attorney, Agent, or Firm* — Merchant & Gould P.C.

(57)          ABSTRACT

A multilayer material includes n base units with n being a natural, non-zero integer, a base unit including a laminate having in order: a cross-linked silicone resin layer having expandable graphite particles from a temperature greater than a cross-linking temperature of the resin, and an impregnated silica or alumina fabric or knit layer, the fabric or knit being provided with gaps, all impregnated with a cross-linked silicone resin, having expandable graphite particles from a temperature greater than a cross-linking temperature of the resin. The number n of base units is between 1 and 5 inclusive. The nth base unit being covered with another cross-linked silicone resin layer, also having expandable graphite particles from a temperature greater than a cross-linking temperature of the resin, to form a laminate with an alternating resin layer and a fabric or knit layer.

11 Claims, 5 Drawing Sheets

(51) Int. Cl.

| | |
|---|---|
| *H01M 50/222* | (2021.01) |
| *H01M 50/227* | (2021.01) |
| *H01M 50/231* | (2021.01) |
| *H01M 50/233* | (2021.01) |

(52) U.S. Cl.
CPC ....... *H01M 50/227* (2021.01); *H01M 50/231* (2021.01); *H01M 50/233* (2021.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/101* (2013.01); *B32B 2264/108* (2013.01); *B32B 2264/203* (2020.08); *B32B 2264/303* (2020.08); *B32B 2307/7376* (2023.05); *B32B 2457/10* (2013.01); *B32B 2571/00* (2013.01)

(58) Field of Classification Search
CPC ........ B32B 2307/7376; B32B 2250/20; B32B 2255/02; B32B 2255/26; B32B 2260/023; B32B 2260/046; B32B 2262/101; B32B 2264/108; B32B 2457/10; B32B 2571/00; H01M 50/231; H01M 50/227; H01M 50/222; H01M 50/233
See application file for complete search history.

(56) References Cited

U.S. PATENT DOCUMENTS

| | | | |
|---|---|---|---|
| 2013/0004747 A1* | 1/2013 | Schwarz | ............. D06N 7/0092 |
| | | | 428/196 |
| 2021/0013460 A1 | 1/2021 | Ootsuki | |

OTHER PUBLICATIONS

ACS Materials, properties of expandable graphite (Year: 2025).*
French Search Report received for FR Serial No. FR 2210558 on Jun. 27, 2023, 9 pgs.
Zhang et al., "Study on the synthesis and thermal stability of silicone resins reinforced by Si—O—Ph crosslinking," Royal Society of Chemistry, RSC Adv., 2021, 11, 30971, Received Jul. 19, 2021, Accepted Sep. 12, 2021, pp. 30971-30979.
Shin Estsu, Shin-Etsu Silicone, "UV Cure Liquid Silicone Rubbers," pp. 1-10.

* cited by examiner step a)

step b)

step c)

step d)

FLEXIBLE MULTILAYER MATERIAL RESISTANT TO THE EXPLOSION OF AN ELECTRIC BATTERY

REFERENCE TO RELATED APPLICATIONS

This application claims priority from French Patent Application No. FR2210558 filed on Oct. 13, 2022. The entire contents of the priority application is incorporated herein by reference.

TECHNICAL FIELD

The invention relates to the field of electric batteries.

The invention relates more specifically to a multilayer material which can serve as a mechanical and thermal shield for an electric battery application.

PRIOR ART

Numerous fields require the use of a mechanical and thermal protection.

In particular, the protection of batteries, particularly lithium-ion batteries, is currently a major challenge for the safety and reliability of electric or hybrid transport vehicles, whatever the sector in question (automotive, in particular, light vehicles, heavy vehicles, buses or coaches, aeronautical, rail, naval, etc.).

Indeed, electric vehicle batteries can, under certain conditions, suffer an uncontrollable thermal runaway phenomenon, leading to the explosion of the battery in a few seconds.

This explosion, further to a blast effect, is accompanied by a projection of particles having a temperature which can exceed 1500° C. This is a "blast" phenomenon.

That is why mechanical and thermal shields are placed on and/or around the assembly constituting the battery, in order to confine the blast of the explosion and the projection of hot particles.

Most existing shields are currently mica board-based.

These mica boards actually make it possible to guarantee the mechanical and thermal integrity of the shield, and consequently, to protect all that surrounds it.

However, mica boards are mechanically rigid.

Thus, in particular, when the battery has a complex shape or has numerous curves or angular areas, the shield is formed by cutting mica boards into pieces of suitable dimensions, which are then assembled on the different cavities and raised parts of the battery and joined together.

Further to the fact that this process of adapting the shield into cut mica boards in the shape of the battery takes time, there can be weak areas regarding mechanical and thermal protection at the junctions between each mica board.

With the aim of avoiding the presence of weak areas, it has already been proposed to manufacture a mould in the shape of the battery which is then used to form a shield of a composite material comprising mica platelets submerged in a resin. The hardening of the resin makes it possible to form the rigid mica shield.

Manufacturing the shield however remains time-consuming, and particularly, a dedicated mould must be manufactured for each battery shape.

Moreover, multilayer materials are also known for thermal protection. These multilayer materials have the advantage of being flexible and therefore adaptable to any shapes, whether for objects or for people.

A multilayer material typically used for this purpose is formed of a silica fabric, coated on at least one of its faces with a cross-linked silicone resin.

Document KR102349628B1 can, for example, be referred to, which describes a fire-resistant shield comprising a multilayer material comprising a silica fabric coated with a silicone resin layer with, optionally, flame retardants, such as alumina hydroxide, magnesium hydroxide, silica, phosphorous-based, ceramic particles, or mixtures of these.

However, this multilayer material does not resist the very limiting mechanical and thermal conditions of an electric battery "blast" phenomenon.

An aim of the invention is to resolve at least one of the abovementioned disadvantages.

In particular, an aim of the invention is to propose a solution which can form a mechanical and thermal shield capable of resisting the "blast" phenomenon of an electric battery, capable of being adapted to any battery geometry, without other difficulty.

SUMMARY OF THE INVENTION

To achieve at least one of these aims, the invention proposes a multilayer material comprising n base units with n a natural, non-zero integer, a base unit consisting of a laminate comprising, in order:

a cross-linked silicone resin layer comprising graphite particles expandable from a temperature greater than a cross-linking temperature of said resin;

a silica or alumina fabric or knit layer, the fabric or knit being provided with gaps, all impregnated with a cross-linked silicone resin comprising graphite particles expandable from a temperature greater than a cross-linking temperature of said resin, wherein:

the number n of base units is between 1 and 5 inclusive, the $n^{th}$ base unit being coated with another cross-linked silicone resin layer comprising graphite particles expandable from a temperature greater than a cross-linking temperature of said resin, so as to form a laminate formed of an alternating resin layer and a fabric or knit layer.

The invention can comprise at least one of the following features, taken individually or in combination:

the thickness of the base unit is between 900 and 1150 μm;

the number n of base units is between 1 and 3 inclusive, and is preferably 2 or 3;

the multilayer material has a total thickness of between 1100 and 5950 μm;

the multilayer material comprises a number n=2 base units, for a total thickness of between 2000 and 2500 μm;

the multilayer material comprises a number n=3 base units, for a total thickness of 2900 and 3650 μm;

the silicone resin comprises an additional load chosen from the group constituted of short silica or alumina fibers, of pyrogenic silica particles, or magnesium hydroxide particles, of vermiculite, of clay particles, of titanium oxide particles, of silicon carbide particles, or of mixtures of two or more of these;

the silicone resin, cross-linked or not, comprises 5 to 15% by mass, with respect to the total mass of the resin, of expandable graphite particles and comprises 4 to 7% by mass, with respect to the total mass of the resin, of pyrogenic silica;

the expandable graphite particles have their largest dimension of between 80 and 110 μm, preferably a larger dimension of 90 μm;

DETAILED DESCRIPTION

The invention proposes a multilayer material comprising n base units with n a natural, non-zero integer, a base unit consisting of a laminate comprising, in order:

a cross-linked silicone resin layer comprising graphite particles expandable from a temperature greater than a cross-linking temperature of said resin;

a silica or alumina fabric or knit layer, the fabric or knit being provided with gaps, all impregnated with a cross-linked silicone resin comprising graphite particles expandable from a temperature greater than a cross-linking temperature of said resin, wherein:

the number n of base units is between 1 and 5 inclusive, the $n^{th}$ base unit being coated with another cross-linked silicone resin layer comprising graphite particles expandable from a temperature greater than a cross-linking temperature of said resin, so as to form a laminate formed of an alternating resin layer and a fabric or knit layer.

Figure 1:
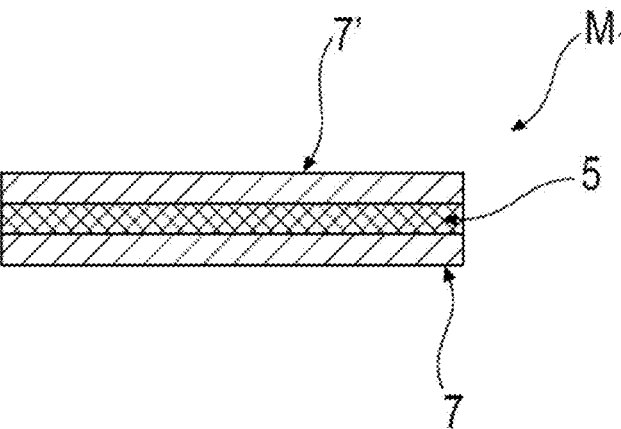
FIG. 1 represents a multilayer material according to the invention, according to an example of an embodiment.

In FIG. 1, an example of multilayer material $M_1$ according to the invention has been represented, providing a base unit (n=1). Similarly, in FIG. 2, an example of multilayer material $M_2$ according to the invention has been represented, providing two base units (n=2).

A silica or alumina fabric layer 5, 5' typically has a thickness of between 420 and 460 μm. The fabric is formed from silica or alumina fibers formed in woven threads, for example with a plain weave.

An example of silica fabric used to form the multilayer material of the invention is a silica fabric, commercialized under the reference Valmiera® Glass, KA-300. The technical sheet of this product can be referred to, to know all the features of this fabric. However, this silica fabric has the following main features: fabric constituted of threads in 34×6 (chain/weft) or 68×3 (chain/weft) with filaments of 6 μm in diameter, plain weave with a full feather length of 5 to 8 mm, thermally treated with an aminosilane finishing, tension resistance in the chain direction: greater than or equal to 700N/25 mm and in the weft direction: greater than or equal to 600N/25 mm, base weight of 300 $g/m^2$, thickness of around 440 μm.

An example of alumina fabric which can be used to form the multilayer material of the invention is an alumina fabric commercialized by the company 3M, under the reference Nextel® 440.

The use of a silica or alumina fabric provides a great flexibility, while contributing to the mechanical and thermal strength requirements to an electric battery "blast" test.

The gaps of this fabric are all impregnated by the cross-linked silicone resin.

Consequently, the expandable graphite particles are present in all the gaps of the silica or alumina fabric, and not only in some of these gaps.

To obtain an impregnation of the silica or alumina fabric in all its gaps, a liquid, non-cross-linked silicone resin is therefore used during manufacture.

By "liquid resin", this means a resin having an apparent viscosity of between 20 and 35 Pa·s.

This viscosity can, in particular, be measured by the Brookfield method (NF EN ISO 2555—Plastics—Liquid-state resins or in emulsions or dispersions—Determination of the apparent viscosity by the method of the rotary viscosimeter of the cylinder type) with the following conditions of implementation:

TABLE 1

| Mobile reference | S06 |
| --- | --- |
| Rotation speed of the cylinder (rpm) | 20 |
| Temperature of the sample (° C.) | 24.7 |
| Volume of the sample (mL) | 400 |

Generally, to produce the liquid, non-cross-linked silicone resin, the following composition can be provided:

dimethyl-siloxane: 65 to 75 parts by mass,

Vinyl siloxane: 0 to 7 parts by mass (optional)

Methyl hydrogenosiloxane: 15 to 25 parts by mass

Additional load: 0 to 10 parts by mass (optional)

Platinum catalyst: 0.3 to 1 part by mass

Expandable graphite: 4 to 14 parts by mass

Optionally, the silicone resin can therefore contain one or more additional loads chosen from the group constituted of short fibers (namely fibers having a length less than or equal to 6 mm) of silica or alumina, of pyrogenic silica particles, of magnesium hydroxide particles, of vermiculite, of clay particles such as montmorillonite, of titanium oxide particles, of silicon carbide (SiC) particles, and mixtures of two or more of these.

Thus, and for example, the silicone resin, cross-linked or not, can in particular comprise:

5 to 15%, and in particular, between 5% and 10% by mass, with respect to the total mass of the resin, of expanded graphite particles, and 4 to 7% by mass, with respect to the total mass of the resin, of pyrogenic silica. During manufacture, dimethyl-siloxane, methylhydrogenosiloxane and when this is provided, vinylsiloxane monomers, cross-link.

The expandable graphite particles have the property of resisting temperatures greater than 1500° C., in the absence of oxygen, which is the case when they are submerged in the cross-linked silicone resin.

As they are integrated in the silicone resin, which impregnates the core silica fabric, they will, during their expansion, be closely mixed with the silica fibers and form, with these silica fibers, a real full barrier of a material resisting at least 1500° C. by moreover reinforcing the mechanical resistance of the silica fabric.

For this, it must be understood that the graphite particles are in a non-expanded state in the cross-linked silicone; in other words, that the cross-linking temperature of the silicone resin is less than the temperature at which the graphite particles start to expand. A slight expansion can be tolerated, even though it must be understood that this temperature at which the graphite particles start to expand, like a temperature from which a strong and rapid expansion is observed, of the graphite particles.

Typically, the expandable graphite particles have the property of starting to expand (increase of volume) strongly and rapidly from a temperature which can be between 160° C. and 220° C., sometimes above. Therefore, a silicone resin should be chosen, for which the cross-linking temperature is suitable.

Preferably, the expandable graphite particles are particles having their largest dimension of between 80 and 110 μm, as this enables a more homogeneous distribution of the particles in the silicone resin. An example of expandable graphite particles can be used in the invention are graphite particles commercialized by the company NEOGRAF® Solutions, under the brand GrafGuard®, grade 210-200N (the first number, namely 210 means the critical temperature from which the graphite starts to expand, that is 210° C. and the second number, namely 200, is a reference, meaning qualified small particles, namely in the range going from 80 to 110 μm).

It is understood that the more the number n of base units of the multilayer material increases, the more the resistance to the electric battery "blast" phenomenon increases.

However, the more the number n of base units of the multilayer material increases, the more it also loses in flexibility. Indeed, although the fabric provides a great flexibility, the total thickness and indeed, the quantity of cross-linked resin used have an impact on this flexibility.

For this reason, it is preferable that the number n of base units is not greater than 5.

When a very close environment of the battery is sought, it is preferable that the number n of base units is between 1 and 3. And when, in addition, a resistance to the "blast" phenomenon of an electric battery is also sought to be further improved, it is thus preferable to choose n=2 or 3 base units.

All the comments made above about the silicone resin relate not only to the resin impregnated in the silica fabric, but also the resin which can be used to form the other layers.

It is moreover advantageous that the silicone resin used is the same for all the manufacture of the multilayer material. This facilitates the manufacture. It is however, absolutely possible to have different compositions, on the condition, naturally, that in the non-cross-linked state, these resins are liquid to impregnate all the gaps of the silica or alumina fabric.

According to the number of base units, of between 1 and 5, and to the choices made for each layer (thickness of the fabric, quantity of resin deposited), of layers of multilayer material, the latter will have a total thickness typically of between 1100 and 5950 μm.

Finally, it must be noted that the fabric can be replaced by a knit, therefore implementing a silica or alumina knit.

Example No 1 of an Embodiment of the Invention

A method for manufacturing a multilayer material according to the invention will now be described, in support of FIG. 3, and more specifically the multilayer material represented in FIG. 1 (n=1 base unit).

The fabric used is a silica fabric commercialized under the reference Valmiera® Glass KA-300, the property principles of which have been provided above. The fabric 1 can be seen in FIG. 2, step a).

Figure 2:
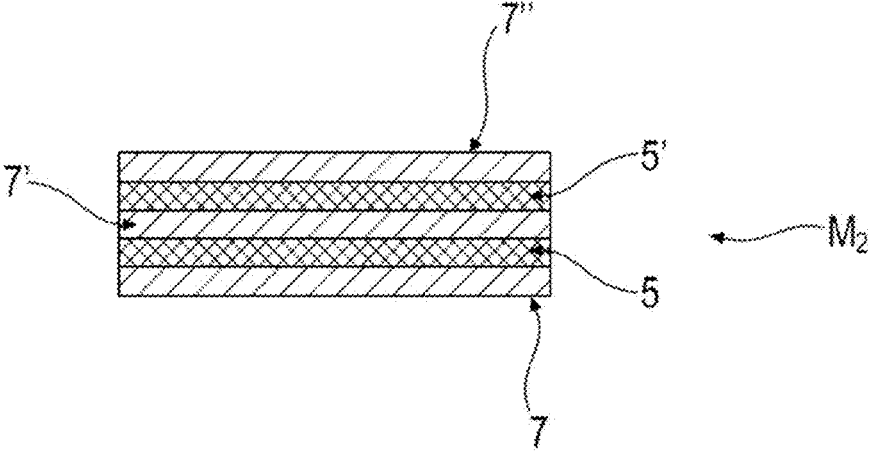
FIG. 2 represents a multilayer material according to the invention, according to another example of an embodiment.

This fabric is then impregnated by coating with 350 g/m² of the non-cross-linked silicone resin on the face 3, exposed at the coating roller 2, of the fabric 1 (the face 4 of the fabric 1 is, itself, not exposed to the coating roller 2). The positioning of the coating roller before the coating per se is represented in FIG. 2, step a).

To achieve the liquid non-cross-linked silicone resin, the following composition is provided:

Dimethyl-siloxane: 69 parts by mass,
Vinyl siloxane: 6 parts by mass,
Methyl hydrogenosiloxane: 20 parts by mass,
Pyrogenic silica: 4.5 parts by mass,
Platinum catalyst: 0.5 parts by mass,
Expandable graphite: 7 parts by mass.
No solvent or diluent is used.

The viscosity has been measured by the Brookfield method under the conditions specified above, but reminded of below:

TABLE 2

| Mobile reference | S06 |
| --- | --- |
| Rotation speed of the cylinder (rpm) | 20 |
| Temperature of the sample (° C.) | 24.7 |
| Volume of the sample (mL) | 400 |

The quantity of silicone resin makes it possible to impregnate the fabric 5, in all its gaps, and moreover, to form at the same time, a silicon resin layer 7 exceeding the fabric.

The assembly thus obtained is passed into a furnace at 200° C., to cross-link the resin. The resin has no removal during its cross-linking. FIG. 2, step b) represents the fabric 5 impregnated with cross-linked silicone resin, with silicone resin above the layer 7. FIG. 2, step b) therefore represents a base unit of the multilayer material.

This base unit is thus returned ready to be coated. This is what is represented in FIG. 2, step c).

Then, a coating of the same non-cross-linked silicone resin is then performed on the face 4 opposite the fabric layer 5 of the base unit, at a rate of 700 g/m². At this stage, an assembly with the layers 7, 5 and 7" is obtained.

The assembly thus obtained is again passed into the furnace at 200° C. to cross-link all the non-cross-linked silicone resin. This results in the desired multilayer material M₁, as is represented in FIG. 2, step d). The multilayer material M₁ is presented in the form of a laminate formed of an alternating resin layer and a fabric layer.

The multilayer material M1 finally obtained (n=1 base unit) has a total thickness of between 1100 and 1350 μm.

Example No 2 of an Embodiment of the Invention

Figure 3:
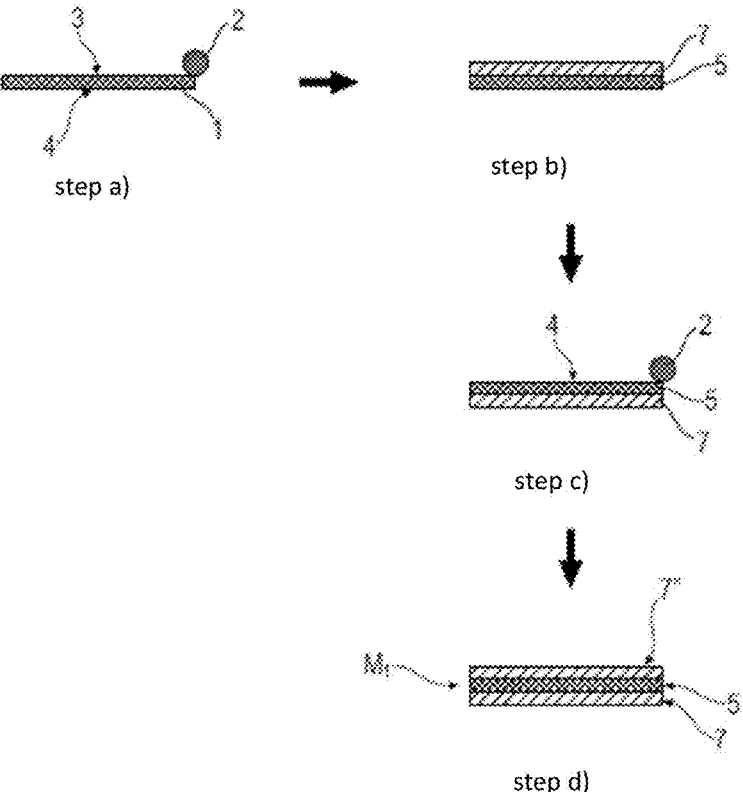
FIG. 3 represents the different steps of a manufacturing method which can be considered to obtain the multilayer material of FIG. 1.
Figure 4:
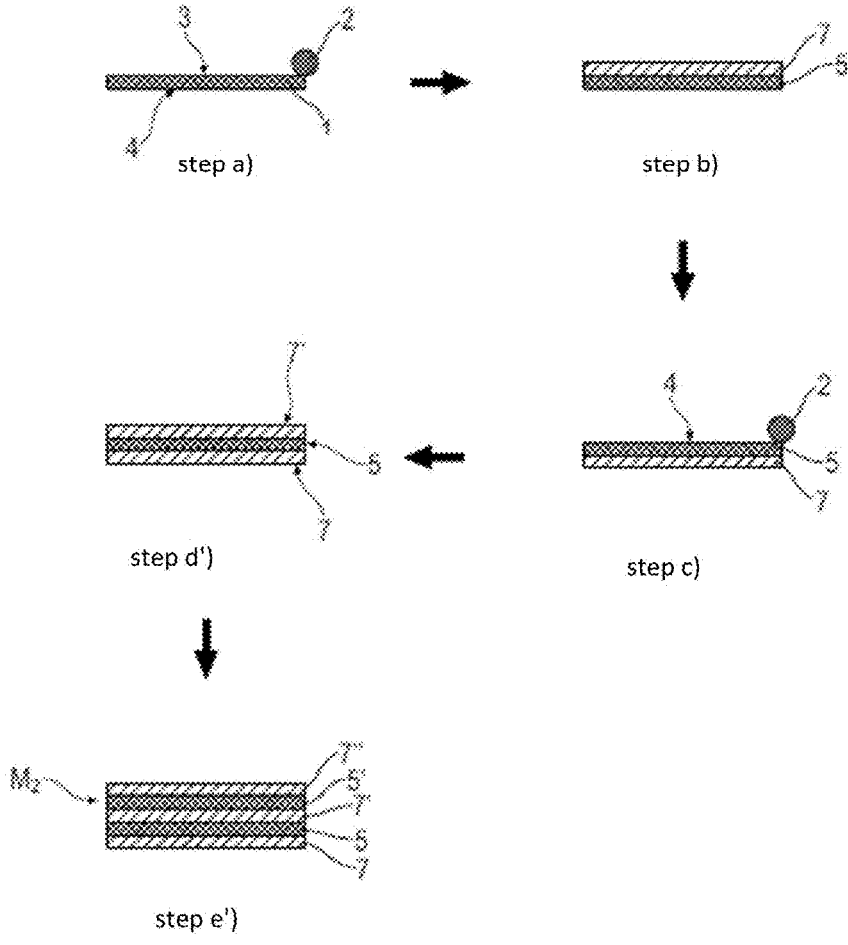
FIG. 4 represents the different steps of a manufacturing method which can be considered to obtain the multilayer material of FIG. 2.

In this case, the steps a), b) and c) of FIG. 4 (n=2 base units) go back to steps a), b) and c) of FIG. 3 (n=1 base unit).

Then, additional steps are provided.

Thus, a coating of the same non-cross-linked silicone resin is performed on the face 4 opposite the fabric 5, at a rate of 700 g/m². No cross-linking is however performed. Thus, the assembly represented in FIG. 4, step d') is arrived at.

Then, a part of the assembly obtained in step b) is recovered.

The latter is thus affixed to the layer 7' of the assembly obtained in step b).

The assembly thus obtained is again passed into the furnace at 200° C. to cross-link all the non-cross-linked silicone resin.

Thus, the multilayer material $M_2$ represented in FIG. 4, step e') is obtained, constituted, starting from the bottom to the top:

of a first base unit formed of a cross-linked resin layer 7 coated with a silica fabric 5 impregnated with cross-linked silicone resin;

a second base unit formed of a cross-linked resin layer 7' coated with a silica fabric 5' impregnated with cross-linked silicone resin; and another cross-linked resin layer 7".

The multilayer material $M_2$ is presented in the form of a laminate formed of an alternating resin layer and a fabric layer.

This multilayer material (n=2 base units) has a total thickness of between 2000 and 2500 μm.

OTHER EXAMPLES OF EMBODIMENTS OF THE INVENTION

It must be noted that to manufacture a multilayer material comprising n=3, 4 or also 5 base units, this should be repeated at many times as is necessary, namely 1, 2 or 3 times in a row, the additional steps described in support of example no. 2 of the embodiment of the invention.

Typically, a multilayer material according to the invention with n=3 base units will have a total thickness of between 2900 and 3650 μm.

Typically, a multilayer material according to the invention with n=4 base units will have a total thickness of between 3800 and 4800 μm.

Typically, a multilayer material according to the invention with n=5 base units will have a total thickness of between 4700 and 5950 μm.

Blast Test

A "blast test" is, in the present text, a test carried out under extreme conditions which reproduce the worst conditions which could occur during the explosion of an Li-ion battery, i.e. a projection of particles melting at a temperature of 1500° C.

Figure 5:
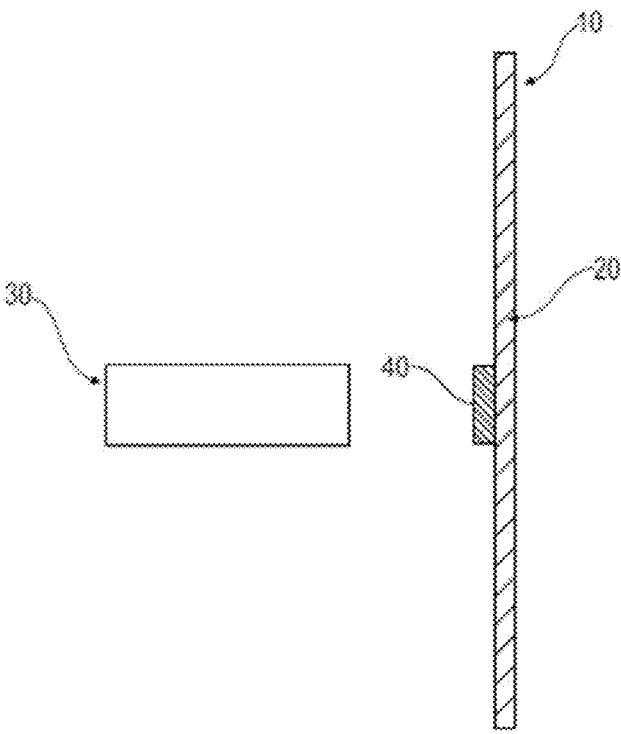
FIG. 5 is a diagram of an experimental installation adapted to test the performance of the multilayer material in a "blast" test of an electric battery.

A simplified diagram of the experimental installation used to carry out the "blast test" forms the subject of FIG. 5.

As can be seen in FIG. 3, a sample 20 of 250 mm×250 mm of the material to be tested is placed in an EN AW-5182 aluminum frame 10. A system 30 for projecting particles is placed at a distance of 30 mm (impact distance) and centered on the desired impact area 40 to reproduce the "blast" phenomenon. The system 30 for projecting particles is a pyrotechnic rocket, the features of which are as follows: effect distance of between 4 and 5 m, lateral reach of between 1.5 and 2.5 m, acoustic pressure level of 94 dB (Almax) at 3 m, and comprising particles which can form incandescent particles at 1500° C. The acoustic pressure level makes it possible to consider the speed of the particles at 3 m, and therefore indirectly from this speed at the impact distance (30 mm).

The system 1 for projecting particles is started. The duration of projection of incandescent particles is limited to 20 seconds, duration at the end of which the system stops automatically if the sample is not perforated before.

If the sample is perforated before the projection duration of 20 seconds, the time at which the perforation occurs is noted. In this case, the sample is considered as not having reached the desired resistance to the "blast".

If, at the end of 20 seconds, the sample is not perforated, the sample is considered as having reached the desired resistance to the "blast".

Results of the Blast Test

The multilayer material represented in FIG. 1 (n=1 base unit) has formed the subject of a "blast test", passed successfully. In addition, it has proved to be sufficiently flexible to mould the same complex shapes or curves of the electric battery.

The multilayer material represented in FIG. 2 (n=2 base units) has also formed the subject of a "blast test", passed successfully. In addition, it has proved to be sufficiently flexible to mould the same complex shapes or curves of the electric battery.

Other materials have been tested, as comparative examples (comparative examples 1 to 5).

Comparative Example 1

A multilayer material has been manufactured by proceeding like in "example no. 1 of the embodiment of the invention" (one single base unit), but by using a silicone resin which does not contain expandable graphite particles.

The only difference with respect to example no. 1 of the embodiment is therefore the absence of graphite particles.

The blast test has been a failure.

Comparative Example 2

A multilayer material has been manufactured like in "example no. 2 of the embodiment of the invention" (two base units), but by using a silicone resin which does not contain expandable graphite particles.

The only difference with respect to example no. 2 of the embodiment is therefore the absence of graphite particles.

The blast test has been a failure.

Comparative Example 3

A multilayer material has been manufactured by going back to one of the "other examples of the embodiment of the invention" (three base units), by using a silicone resin which does not contain expandable graphite particles.

There also, the blast test has been a failure.

Comparative Example 4

A multilayer material of the prior art has been considered, constituted of a "Mica board Vonroll shield T18®"-type mica board, commercialized by the company VonRoll.

The blast test has been a failure.

In addition, this board is too rigid to mould the complex shapes or curves of an electric battery, without cutting or applying a method involving a mould.

Comparative Example 5

In this case, a multilayer material of the prior art has been considered, constituted of two mica boards, each of the "Mica board Vonroll shield T18®"-type, commercialized by the company VonRoll.

The blast test has been passed successfully.

However, this assembly of two boards is naturally too rigid to mould the complex shapes or curves of an electric battery, without cutting or applying a method involving a mould.

Comparative examples 1 to 3 actually show the interest of the presence of expanded graphite particles in the silicone resin, moreover with a homogeneous presence, in particular in the whole thickness of the silica fabric. Without this, the blast test cannot be passed successfully.

In addition, if the multilayer material according to the invention passes the blast test successfully already with a base unit and that its performance can only improve with additional base units, it is also seen that the increase of the number of base units in the comparative examples does not make it possible, for all that, to pass the blast test successfully.

As regards the mica board solution, it is seen that a minimum thickness remains necessary to pass the blast test successfully.

The invention claimed is:

1. A multilayer material comprising n base units with n being a natural, non-zero integer, each of the base units comprising a laminate comprising, in order:

a cross-linked silicone resin layer comprising resin including graphite particles expandable from a temperature greater than a cross-linking temperature of said resin;

an impregnated silica or alumina fabric or knit layer, the fabric or knit being provided with gaps, all the gaps being impregnated with said cross-linked silicone resin or another cross-linked silicone resin comprising graphite particles expandable from a temperature greater than a cross-linking temperature of said resin; wherein:

the number n of base units is between 1 and 5 inclusive, the $n^{th}$ base unit being covered with another cross-linked silicone resin layer, further comprising graphite particles expandable from a temperature greater than a cross-linking temperature of said resin, to form the laminate formed of an alternating resin layer and a fabric or knit layer.

2. The multilayer material according to claim 1, wherein a thickness of the base unit is between 900 and 1150 µm.

3. The multilayer material according to claim 1, comprising 1-3 base units.

4. The multilayer material according to claim 3, having a total thickness of between 1100 and 5950 µm.

5. The multilayer material according to claim 1, comprising 2 base units for a total thickness of between 2000 and 2500 µm.

6. The multilayer material according to claim 1, comprising 3 base units for a total thickness of between 2900 and 3650 µm.

7. The multilayer material according to claim 2, wherein the silicone resin comprises an additional load chosen from the group consisting of short silica or alumina fibers, of pyrogenic silica particles, of magnesium hydroxide particles, or vermiculite, of clay particles, of titanium oxide particles, of silicon carbide (SiC) particles, and mixtures of two or more of the fibers or particles.

8. The multilayer material according to claim 1, wherein the silicone resin comprises:

5 to 15% by mass, with respect to a total mass of the resin, of expanded graphite particles, and 4 to 7% by mass, with respect to the total mass of the resin, of pyrogenic silica.

9. The multilayer material according to claim 1, wherein the expandable graphite particles have a largest dimension of between 80 and 110 µm.

10. The multilayer material according to claim 1, comprising 2 or 3 of the base units.

11. The multilayer material according to claim 1, wherein the expandable graphite particles have a largest dimension of 90 µm.

* * * * *